United States Patent
Yeh et al.

(10) Patent No.: US 9,910,154 B2
(45) Date of Patent: Mar. 6, 2018

(54) SONAR OBSTACLE AVOIDANCE SYSTEM AND METHOD, AND UNMANNED AERIAL VEHICLE

(71) Applicant: HON HAI PRECISION INDUSTRY CO., LTD., New Taipei (TW)

(72) Inventors: Yea-Chin Yeh, New Taipei (TW); Chung-Che Wei, New Taipei (TW); Chieh-Yao Lin, New Taipei (TW); I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 267 days.

(21) Appl. No.: 15/151,139

(22) Filed: May 10, 2016

(65) Prior Publication Data

US 2017/0192093 A1 Jul. 6, 2017

(30) Foreign Application Priority Data

Dec. 31, 2015 (TW) .............................. 104144634 A

(51) Int. Cl.
*G01C 23/00* (2006.01)
*G01S 15/93* (2006.01)
*B64C 39/02* (2006.01)

(52) U.S. Cl.
CPC ............ *G01S 15/93* (2013.01); *B64C 39/024* (2013.01); *B64C 2201/141* (2013.01)

(58) Field of Classification Search
USPC ............................................................ 701/3
See application file for complete search history.

(56) References Cited

U.S. PATENT DOCUMENTS

| | | | | |
|---|---|---|---|---|
| 9,367,067 | B2 * | 6/2016 | Gilmore | G05D 1/101 |
| 2010/0332136 | A1 * | 12/2010 | Duggan | G08G 5/0069 701/301 |
| 2015/0142211 | A1 * | 5/2015 | Shehata | H04N 7/181 701/2 |
| 2015/0160658 | A1 * | 6/2015 | Reedman | G05D 1/102 701/3 |
| 2016/0355257 | A1 * | 12/2016 | Chappell | B64C 39/024 |
| 2017/0076616 | A1 * | 3/2017 | Kanade | G08G 5/045 |
| 2017/0137126 | A1 * | 5/2017 | Wong | B64C 39/024 |

* cited by examiner

*Primary Examiner* — Tyler Paige
(74) *Attorney, Agent, or Firm* — ScienBiziP, P.C.

(57) ABSTRACT

An obstacle avoidance system based on sonar for an unmanned aerial vehicle includes an electric motor, a single sonar module, and a control panel. The sonar module rotates with the electric motor. The control panel controls a rotation of the electric motor, thereby controlling the direction in which obstacles to the flight of the unmanned aerial vehicle are detected by the sonar module. The unmanned aerial vehicle includes a fuselage, the sonar obstacle avoidance system, and an aerial vehicle controller. A sonar obstacle avoidance method is also disclosed.

13 Claims, 4 Drawing Sheets

SONAR OBSTACLE AVOIDANCE SYSTEM AND METHOD, AND UNMANNED AERIAL VEHICLE

CROSS-REFERENCE TO RELATED APPLICATIONS

This application claims all benefits accruing under 35 U.S.C. §119 from Taiwan Patent Application No. 104144634, filed on Dec. 31, 2015 in the Taiwan Intellectual Property Office, the content of which is hereby incorporated by reference.

FIELD

The present disclosure relates to a sonar obstacle avoidance system and method, and unmanned aerial vehicle.

BACKGROUND

Effective obstacle avoidance is necessary in unmanned aerial vehicles. One solution is to apply sonar modules on an unmanned aerial vehicle such as a drone. However, the commonly used sonar module has a directional confinement which relates to a transmitting direction of sound emitted from a sonar emitter. Accordingly, a fully directional obstacle avoidance system would mount at least 4 to 5 sonar modules along directions perpendicular to each other to accomplish effective obstacle detection and avoidance. Yet the sonar module is expensive which makes the unmanned aerial vehicle expensive, which is unsatisfactory for an increased demand. In addition, a number of sonar modules would increase size and weight of the drone, which decreases battery endurance.

What is needed, therefore, is to provide a sonar obstacle avoidance system and method, and unmanned aerial vehicle to solve the above described problems.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
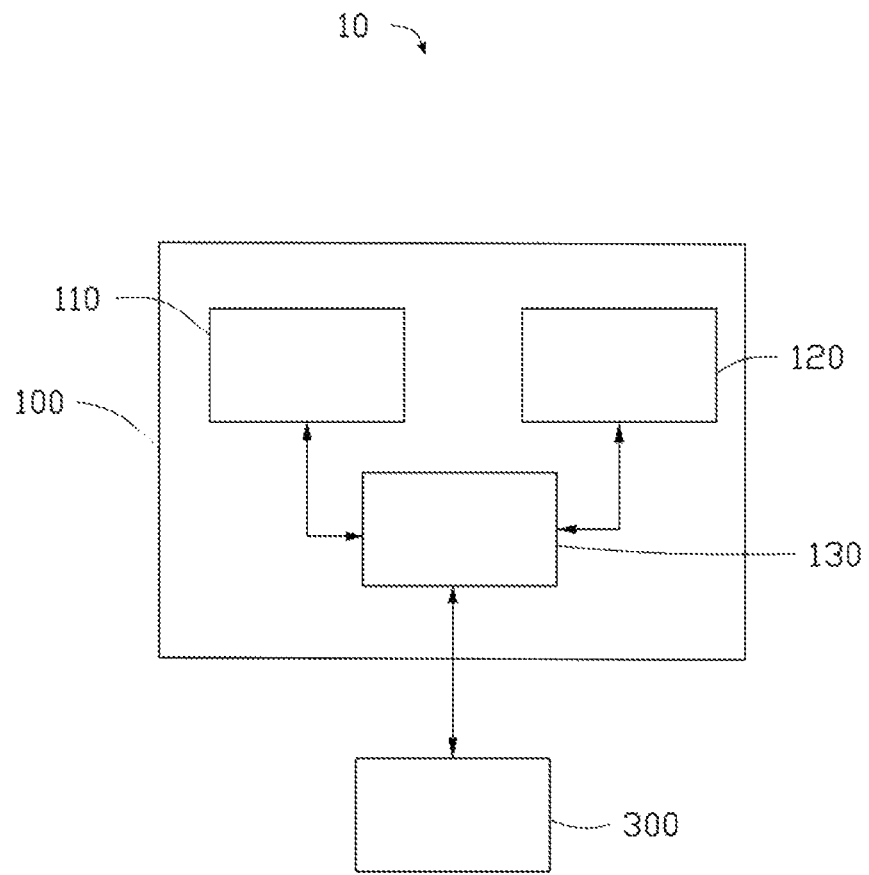
FIG. 1 is a schematic connectional view of an embodiment of a sonar obstacle avoidance system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like. The terms "comprise", "comprising", "include", and "including" do not suggest that another undisclosed feature, element, component, or step must be required or must not be required. Therefore, when using the term "comprise", "comprising", "include", or "including", the term "consist of" or "consisting of" can also be applied. The term "connect" or "connected" can mean both "directly connect" or "directly connected" and "indirectly connect" or "indirectly connected."

Figure 2:
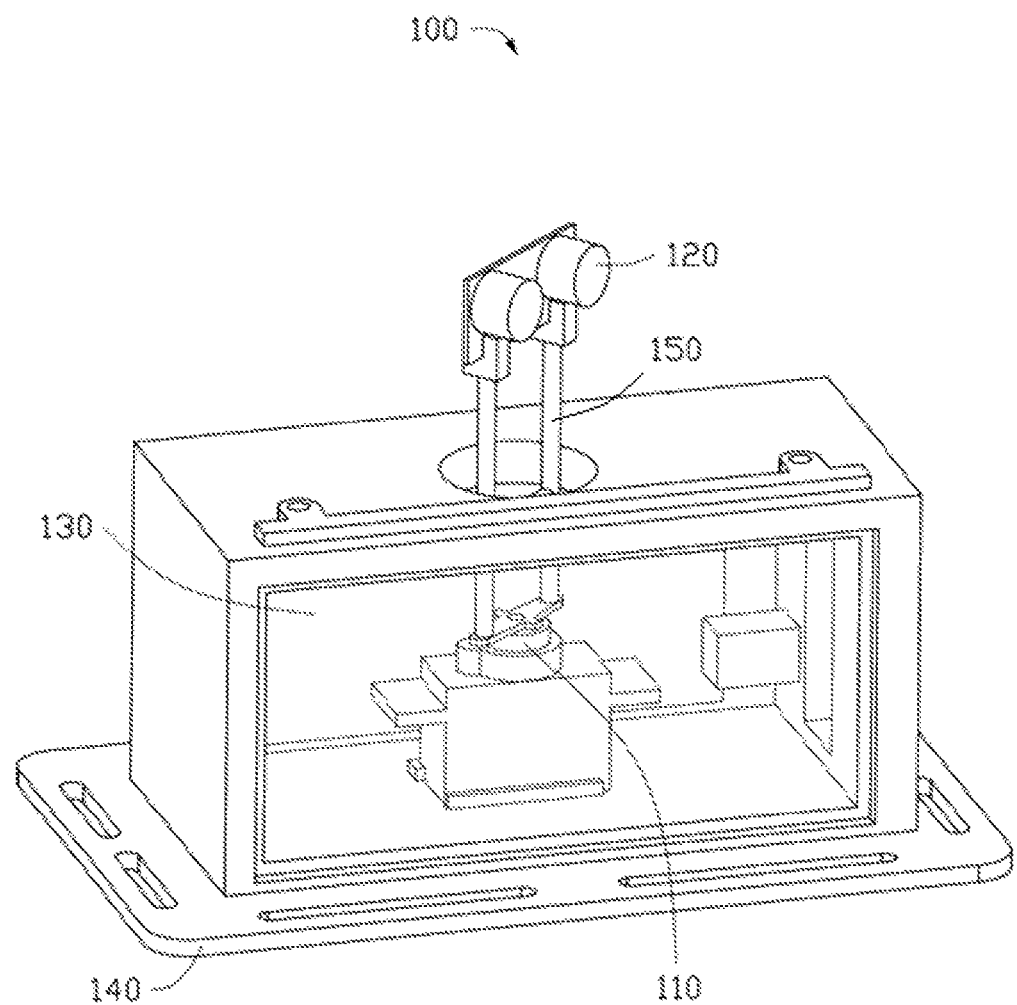
FIG. 2 is a schematic structural view of an embodiment of the sonar obstacle avoidance system of FIG. 1.

Referring to FIG. 1 and FIG. 2, an embodiment of a sonar obstacle avoidance system 100 comprises an electric motor 110, a sonar module 120, and a control panel 130. The sonar module 120 is mounted on the electric motor 110 to synchronizingly rotate with the electric motor 110. The control panel 130 controls rotation of the electric motor 110, thereby controlling an obstacle detecting direction of the sonar module 120. The control panel 130 is capable of receiving a steering order for an unmanned aerial vehicle 10 and controlling the rotation of the electric motor 110 based on the steering order to turn the obstacle detecting direction of the sonar module 120 to a target navigation direction. In one embodiment, the control panel 130 is capable of controlling the rotation of the electric motor 110 based on a target navigation direction information included in the steering order.

Figure 3:
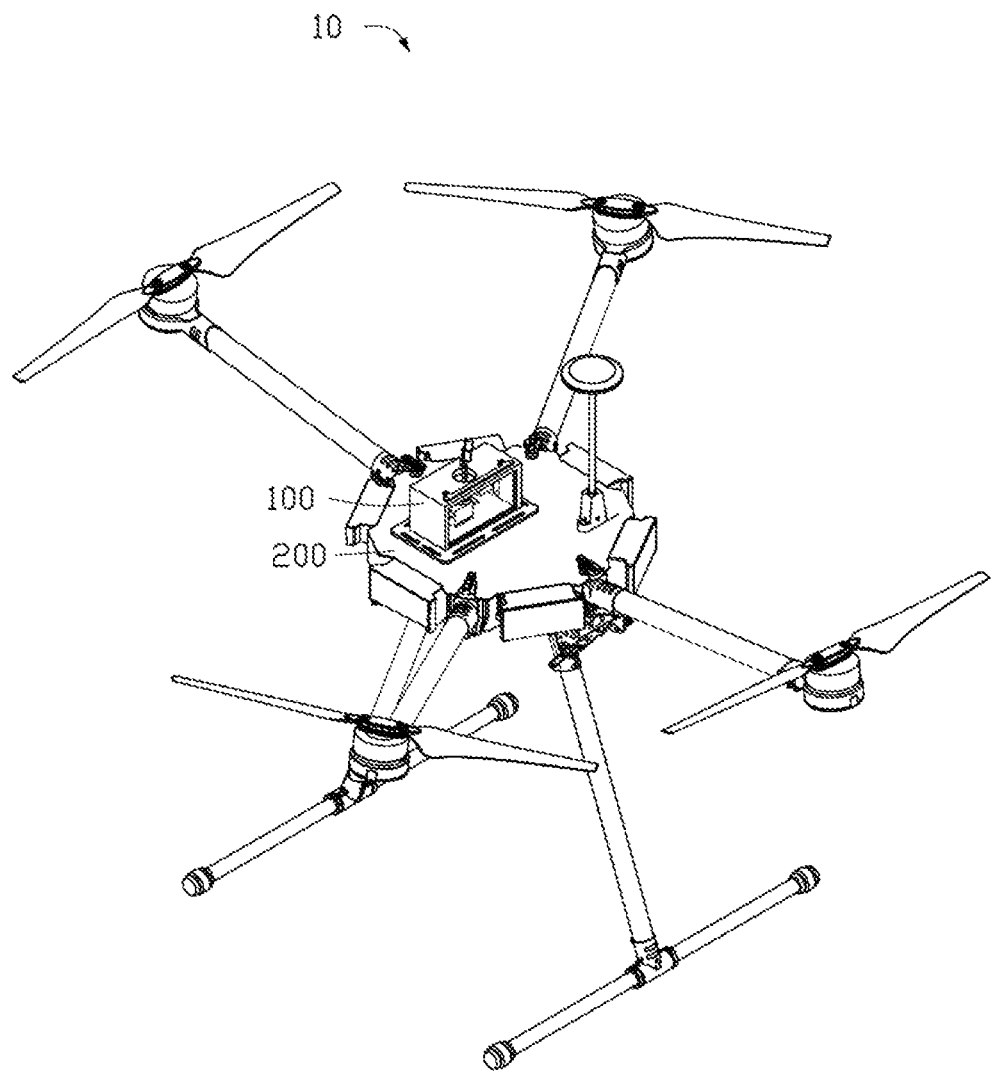
FIG. 3 is a schematic structural view of an embodiment of an unmanned aerial vehicle to which the obstacle avoidance system of FIG. 1 is applied.

Referring also to FIG. 3, an embodiment of the unmanned aerial vehicle 10 comprises a fuselage 200, a sonar obstacle avoidance system 100, and an aerial vehicle controller 300. The sonar obstacle avoidance system 100 and the aerial vehicle controller 300 are both mounted on the fuselage 200. In one embodiment, the sonar obstacle avoidance system 100 and the aerial vehicle controller 300 are mounted on a top surface or a bottom surface of the fuselage 200. The sonar obstacle avoidance system 100 can comprise only one sonar module 120.

The unmanned aerial vehicle 10 has a physical structure with front side and a rear side and can operate with a current navigation direction and a target navigation direction. The current navigation direction of the unmanned aerial vehicle 10 is in the direction in front of the front side. When the current navigation direction is different from the target navigation direction, such as when a deviating steering order is received, the aerial vehicle controller 300 is capable of steering the unmanned aerial vehicle 10 to change from the current navigation direction to the target navigation direction. The front side of the unmanned aerial vehicle 10 can thereby be re-oriented to face the target navigation direction. The aerial vehicle controller 300 is also capable of determining if the steering of the unmanned aerial vehicle 10 is to be performed.

The sonar module 120 comprises a sonar emitter and a sonar detector. The sonar module 120 is capable of emitting ultrasonic sound and detecting reflections of that sound from an obstacle, and is capable of determining a current distance between the unmanned aerial vehicle 10 and the obstacle according to a time period between the emitting and detecting of sounds. Obstacles to the flight of the unmanned aerial vehicle 10 can only be detected in the propagating direction of the sound emitted from the sonar module 120. The propagating direction of the sound is the obstacle detecting direction of the sonar module 120. In one embodiment, the sonar module 120 has only a single obstacle detecting direction.

The electric motor 110 comprises a shaft capable of rotating about a rotating axis. The sonar module 120 is fixed to the shaft and synchronizingly and coaxially rotates with the shaft. The obstacle detecting direction of the sonar module 120 is perpendicular to the rotating axis. The obstacle detecting direction can be changed by the electric motor 110. The electric motor 110 can be a DC motor, an AC motor, or a stepping motor. In one embodiment, the electric motor 110 is a servo motor.

The aerial vehicle controller 300 of the unmanned aerial vehicle 10 is capable of receiving a steering order from a remote hand-held or ground station, and sending the steering order to the control panel 130. The control panel 130 can comprise a circuit board and a central processing unit mounted on the circuit board to receive the steering order from the aerial vehicle controller 300. The control panel 130 is capable of acquiring the target navigation direction information from the steering order and sending a target position signal to the electric motor 110 based on the target navigation direction information. The electric motor 110 rotates the shaft of to the target position thereby synchronizingly rotates the sonar module 120. The obstacle detecting direction of the sonar module 120 is thus rotated to point to the target navigation direction.

In one embodiment, the control panel 130 previously receives a current position signal from the electric motor 110 and compares the target position signal with the current position signal. If the current position signal and the target position signal are the same, then the control panel 130 determines that the target navigation direction is the same with the obstacle detecting direction, and does not transmit the target position signal to the electric motor 110. In this situation, the shaft of the electric motor 110 does not rotate to maintain the obstacle detecting direction of the sonar module 120.

If the target position signal is different from current position signal, then the control panel 130 determines that the target navigation direction is different from the obstacle detecting direction, and transmits the target position signal to the electric motor 110. The shaft of the electric motor 110 thus rotates to a target position to have the obstacle detecting direction of the sonar module 120 to bring the obstacle detecting direction into line with the target navigation direction.

The sonar module 120 is capable of detecting obstacles along the obstacle detecting direction and transmitting to the control panel 130 a distance signal representing the distance between the obstacle and the current position of the unmanned aerial vehicle 10. A safe value range can be previously set in the control panel 130. If the distance signal is within the safe value range, then the control panel 130 does not send a hover signal to the aerial vehicle controller 300. If the distance signal is beyond the safe value range, the control panel 130 sends a hover signal to the aerial vehicle controller 300. By receiving the hover signal, the aerial vehicle controller 300 becomes effectively stationary and the unmanned aerial vehicle 10 does not perform the steering order.

The sonar obstacle avoidance system 100 can further comprise a shell 140 and a sonar supporter 150. The electric motor 110 and the control panel 130 are disposed inside the shell 160. The sonar module 120 is disposed outside the shell 140. The sonar supporter 150 extends from inside to outside of the shell 140. The shaft of the electric motor 110 and the sonar module 120 are respectively connected at two opposite ends of the sonar supporter 170. The sonar module 120 rotates synchronizingly with the shaft of the electric motor 110. The obstacle detecting direction of the sonar module 120 is perpendicular to a rotating axis of the shaft.

Figure 4:
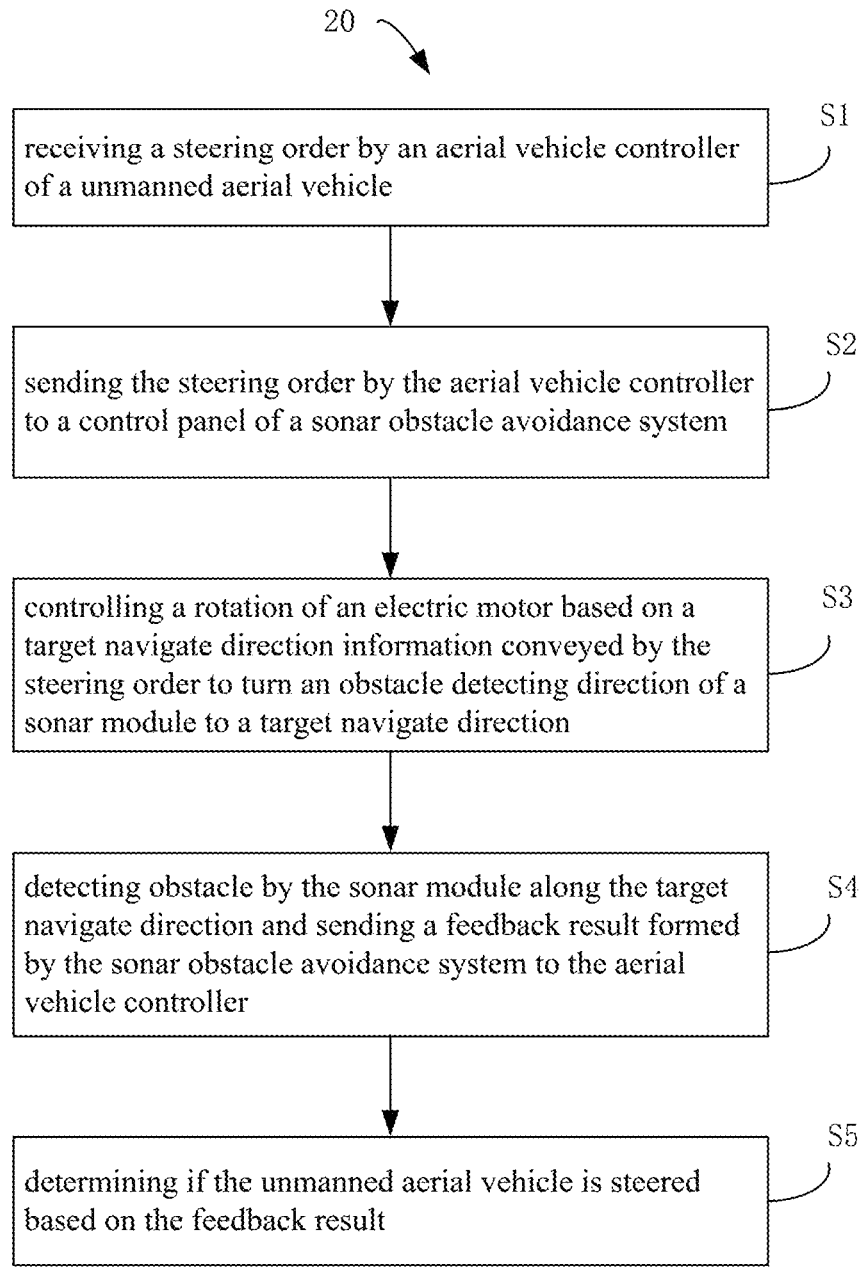
FIG. 4 is a flowchart of an embodiment of a sonar obstacle avoidance method.

Referring to FIG. 4, one embodiment of a sonar obstacle avoidance method 20 comprises steps of:

S1, receiving a steering order by an aerial vehicle controller 300 of a unmanned aerial vehicle 10;

S2, sending the steering order by the aerial vehicle controller 300 to a control panel 130 of a sonar obstacle avoidance system 100;

S3, controlling a rotation of an electric motor 110 based on a target navigation direction information conveyed by the steering order to turn an obstacle detecting direction of a sonar module 120 to a target navigation direction;

S4, detecting obstacle by the sonar module 120 along the target navigation direction and sending a feedback result formed by the sonar obstacle avoidance system 100 to the aerial vehicle controller 300, wherein steps S2, S3 and S4 are processed before changing a current navigate direction of the unmanned aerial vehicle 10 to the target navigation direction; and S5, determining if the unmanned aerial vehicle 10 is steered based on the feedback result.

In step S2, the control panel 130 receives the steering order sent from the aerial vehicle controller 300 and acquires the target navigation direction information from the steering order.

In step S3, the control panel 130 sends a target position signal to the electric motor 110 based on the target navigation direction information to rotate the shaft of the electric motor 110 to the target position thereby synchronizingly rotating the sonar module 120. The obstacle detecting direction of the sonar module 120 is rotated to be the same with the target navigation direction.

The control panel 130 previously receives a current position signal from the electric motor 110 and compares the current position signal with the target position signal. When the current position signal and the target position signal are the same, the control panel 130 determines that the target navigation direction is the same with the obstacle detecting direction, and does not send the target position signal to the electric motor 110. In this situation, the shaft of the electric motor 110 does not rotate to maintain the obstacle detecting direction of the sonar module 120.

When the current position signal and the target position signal are different, the control panel 130 determines that the target navigation direction is the different from the obstacle detecting direction, and transmits the target position signal to the electric motor 110. In this situation, the shaft of the electric motor 110 rotates to the target position to have the obstacle detecting direction of the sonar module 120 to be the same with the target navigation direction.

In step S4, after the sonar module 120 is rotated to the target navigation direction, the sonar module 120 performs the obstacle detection along the target navigation direction and sends a distance signal representing the distance between the obstacle and the current position of the unmanned aerial vehicle 10 to the control panel 130. A safe value range can be previously set in the control panel 130.

When the distance signal is within the safe value range, the control panel 130 sends the feedback result which is a non-reacting signal to the aerial vehicle controller 300. When the distance signal is beyond the safe value range, the control panel 130 sends the feedback result which is a hover signal to the aerial vehicle controller 300.

In step S5, if the aerial vehicle controller 300 receives the non-reacting signal then the aerial vehicle controller 300 controls the unmanned aerial vehicle 10 to perform the steering order. If the aerial vehicle controller 300 receives the hover signal, the aerial vehicle controller 300 controls the unmanned aerial vehicle 10 to be hovered in air.

In another embodiment of step S5, a detecting time period can be previously set in the aerial vehicle controller 300. When the hover signal is not received within the detecting time period, the aerial vehicle controller 300 controls the unmanned aerial vehicle 10 to perform the steering order. When the hover signal is received within the detecting time period, the aerial vehicle controller 300 controls the unmanned aerial vehicle 10 to be hovered in air.

In the present disclosure, the sonar module 120 is rotated to having the obstacle detecting direction to be the same with the target navigation direction, and detects the obstacle along the target navigation direction before steering of the unmanned aerial vehicle 10. Therefore, only one sonar module 120 can perform the obstacle detection along multiple directions. The unmanned aerial vehicle 10 mounting only one sonar module 120 has relatively smaller size and weight, and longer battery endurance. The price of the unmanned aerial vehicle 10 can be decreased to satisfy the need in transportation market.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

The above-described embodiments are intended to illustrate rather than to limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A sonar obstacle avoidance system comprising:
    an electric motor;
    a sonar module mounted on the electric motor to synchronizingly rotate with the electric motor; and
    a control panel controlling a rotation of the electric motor, thereby controlling an obstacle detecting direction of the sonar module.

2. The sonar obstacle avoidance system of claim 1, wherein the control panel is capable of receiving a steering order for an unmanned aerial vehicle and controlling the rotation of the electric motor based on the steering order to turn the obstacle detecting direction of the sonar module to a target navigation direction.

3. The sonar obstacle avoidance system of claim 1 further comprising a shell and a sonar supporter, the electric motor comprises a rotating shaft, the electric motor and the control panel are disposed inside the shell, the sonar module is disposed outside the shell, the sonar supporter extends from inside to outside of the shell, and the rotating shaft of the electric motor and the sonar module are respectively connected at two opposite ends of the sonar supporter.

4. The sonar obstacle avoidance system of claim 1, wherein the electric motor comprises a rotating shaft, and the obstacle detecting direction of the sonar module is perpendicular to a rotating axis of the rotating shaft.

5. The sonar obstacle avoidance system of claim 1 comprising only one sonar module.

6. An unmanned aerial vehicle comprising a fuselage, a sonar obstacle avoidance system, and an aerial vehicle controller, wherein the sonar obstacle avoidance system comprises:
    an electric motor;
    a sonar module mounted on the electric motor to synchronizingly rotate with the electric motor; and
    a control panel controlling a rotation of the electric motor, thereby controlling an obstacle detecting direction of the sonar module.

7. The unmanned aerial vehicle of claim 6, wherein the control panel is capable of receiving a steering order for an unmanned aerial vehicle and controlling the rotation of the electric motor based on the steering order to turn the obstacle detecting direction of the sonar module to a target navigation direction.

8. The unmanned aerial vehicle of claim 6, wherein the sonar obstacle avoidance system is mounted on a top surface or a bottom surface of the fuselage.

9. The unmanned aerial vehicle of claim 6, wherein the sonar obstacle avoidance system comprises only one sonar module.

10. The unmanned aerial vehicle of claim 6, wherein the aerial vehicle controller of the unmanned aerial vehicle is capable of receiving a steering order from a remote or a ground station, and sending the steering order to the control panel of the sonar obstacle avoidance system.

11. A sonar obstacle avoidance method comprises:
    S1, receiving a steering order by an aerial vehicle controller of an unmanned aerial vehicle;
    S2, sending the steering order by the aerial vehicle controller to a control panel of a sonar obstacle avoidance system;
    S3, controlling a rotation of an electric motor, having a shaft mounting a sonar module, based on a target navigation direction information conveyed by the steering order to turn an obstacle detecting direction of the sonar module to a target navigation direction, wherein in response to the control panel sending a target position signal to the electric motor, the electric motor rotating the shaft to the target position and rotating the sonar module to a target navigation direction;
    S4, detecting an obstacle by the sonar module along the target navigation direction and sending a feedback result formed by the sonar obstacle avoidance system to the aerial vehicle controller, wherein steps S2, S3 and S4 are processed before changing a current navigate direction of the unmanned aerial vehicle to the target navigation direction; and
    S5, determining if the unmanned aerial vehicle is steered based on the feedback result.

12. The sonar obstacle avoidance method of claim 11, wherein in S4, the sonar module sends a distance signal representing a distance between an obstacle and a current position of the unmanned aerial vehicle to the control panel.

13. The sonar obstacle avoidance method of claim 12, wherein a safe value range is previously set in the control panel, when the distance signal is within the safe value range, the control panel sends the feedback result which is a non-reacting signal to the aerial vehicle controller; and when the distance signal is beyond the safe value range, and the control panel sends the feedback result which is a hover signal to the aerial vehicle controller.

\* \* \* \* \*